United States Patent

Arriaga

[11] Patent Number: 5,738,586
[45] Date of Patent: Apr. 14, 1998

[54] SEMI-UNIVERSAL TORQUE COUPLING

[75] Inventor: Jorge Arriaga, Ontario, Calif.

[73] Assignee: Consolidated Devices Inc., City of Industry, Calif.

[21] Appl. No.: 303,687

[22] Filed: Sep. 9, 1994

[51] Int. Cl.$^6$ ................................................ F16D 3/00
[52] U.S. Cl. ............................... 464/106; 81/177.75
[58] Field of Search ........................... 464/106, 158, 464/159, 905, 906; 81/177.75; 403/115

[56] References Cited

U.S. PATENT DOCUMENTS

| | | | |
|---|---|---|---|
| 2,780,080 | 2/1957 | Cork | 464/106 |
| 2,941,287 | 6/1960 | Cork | 464/106 X |
| 2,959,943 | 11/1960 | Allen | 464/158 |
| 3,831,400 | 8/1974 | Morin | 464/906 X |
| 3,897,703 | 8/1975 | Phipps | 81/177.75 |
| 4,065,941 | 1/1978 | Aoki | 81/177.75 X |
| 4,188,801 | 2/1980 | Hugh et al. | 464/106 |
| 4,673,376 | 6/1987 | Fender | 464/158 |
| 4,936,701 | 6/1990 | Allen et al. | 81/177.75 X |
| 4,984,942 | 1/1991 | Holtz | 81/177.75 X |
| 5,007,880 | 4/1991 | Walker | 464/159 |
| 5,069,569 | 12/1991 | Lieser | 464/158 X |
| 5,230,659 | 7/1993 | Bird et al. | 464/906 X |
| 5,433,668 | 7/1995 | Harz et al. | 464/906 X |
| 5,460,573 | 10/1995 | Krude | 464/905 X |

Primary Examiner—Daniel P. Stodola
Assistant Examiner—William A. Rivera
Attorney, Agent, or Firm—Georges A. Mawell

[57] ABSTRACT

A Semi-Universal Torque Coupling comprising elongate normally axially aligned torque-transmitting male and female parts, said female part has a central elongate polygonal socket opening with circumferentially spaced radially inwardly disposed longitudinally extending flats entering one end thereof and terminating at a bottom; said male part extends outwardly from the female part and has an outer work-engaging portion and an inner semi-spherical polygonal ball engaged in the socket opening and substantially conforming in radial cross-section with the radial cross-section of the socket opening; an elongate helical spring positioned centrally in the socket opening and connected with and extending freely between the bottom of the socket and the ball; and an annular keeper with a central opening through which the ball cannot move carried by the female part adjacent the forward open end of the socket opening.

7 Claims, 3 Drawing Sheets

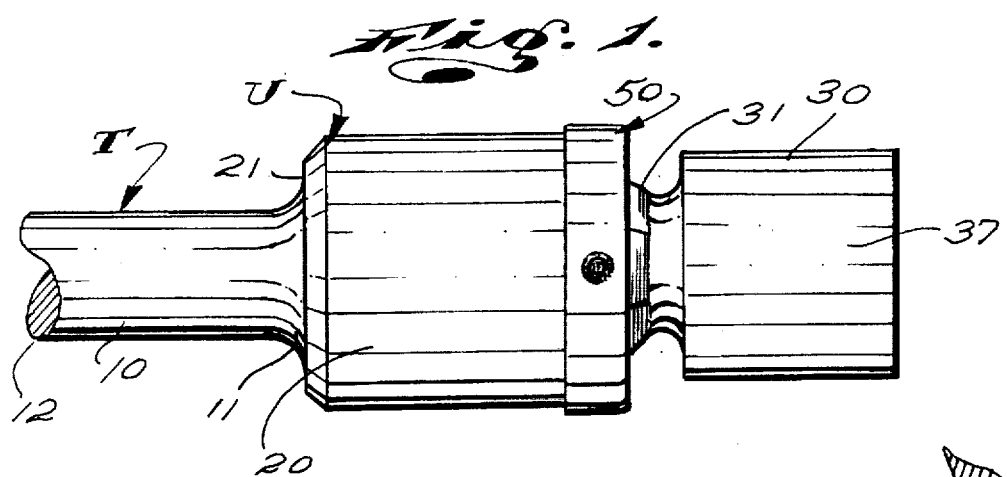
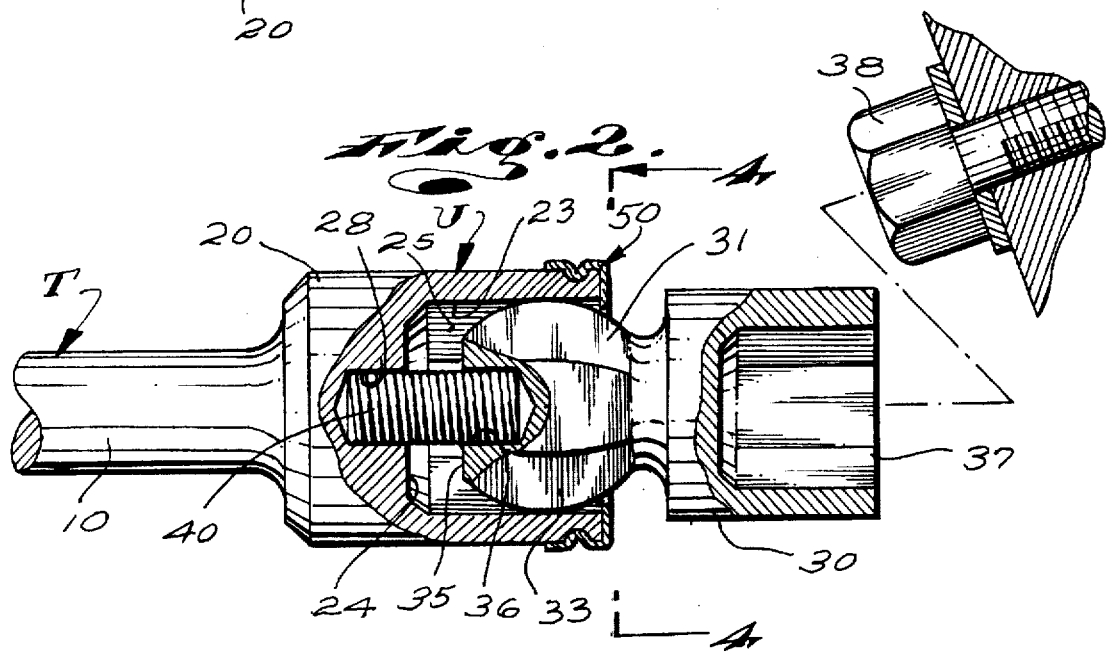
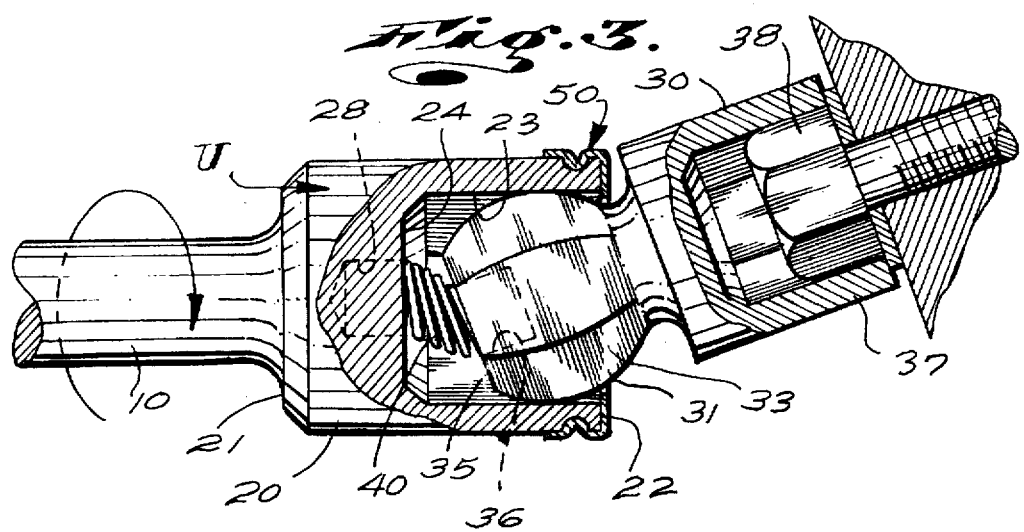

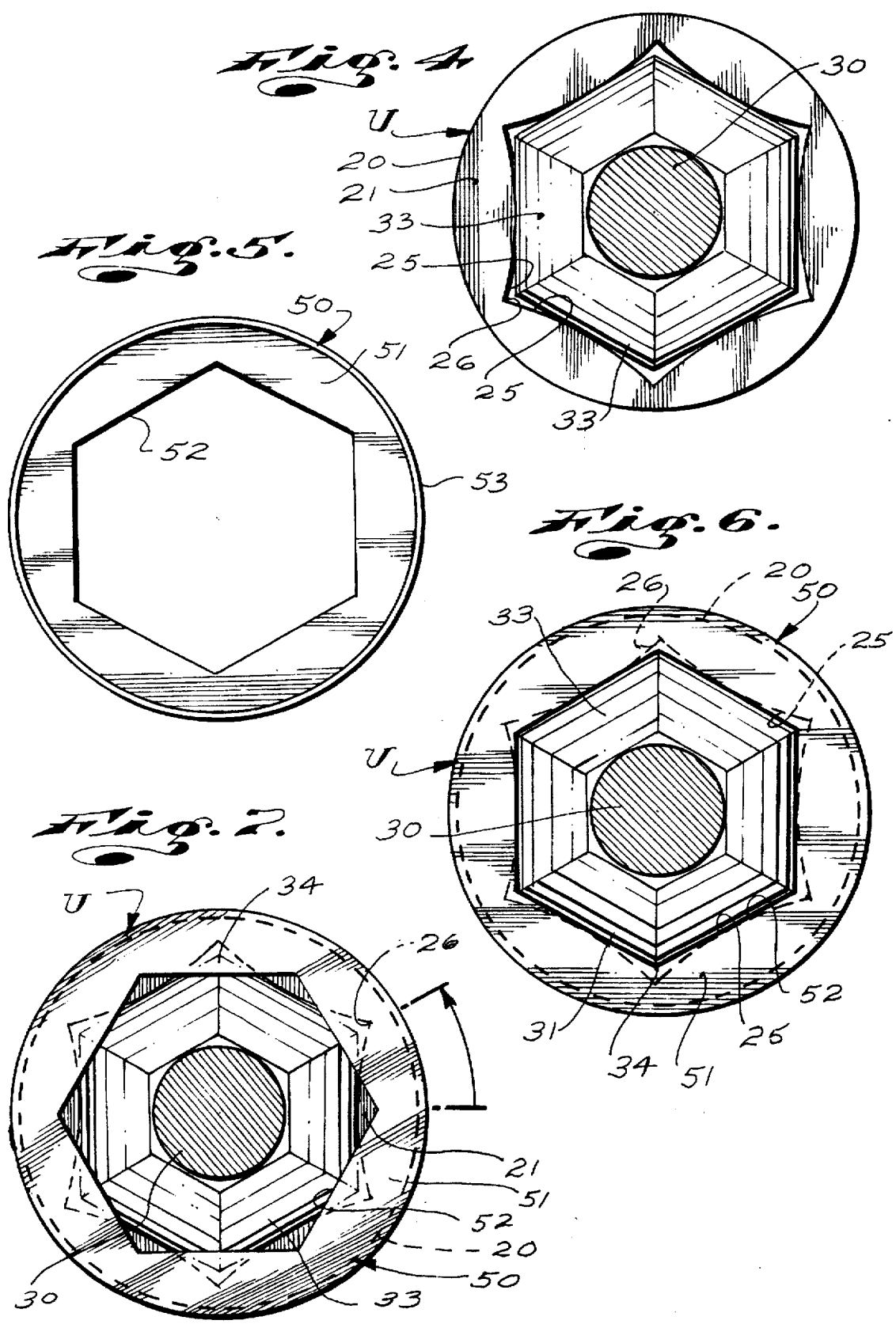

SEMI-UNIVERSAL TORQUE COUPLING

FIELD OF THE INVENTION

This invention has to do with the art of hand tools and the like and is particularly concerned with an improved SEMI-UNIVERSAL TORQUE COUPLING that is suited for coupling-related torque transmitting tool parts in rotary driving engagement with each other and for free lateral pivotal movement relative to each other.

BACKGROUND OF THE INVENTION

Throughout the development of the mechanical arts, there has been a need for means for coupling adjacent opposing ends of elongate torque-transmitting parts, such as shafts, in rotary driving engagement with each other; and, for limited pivotal movement; or axial misalignment, relative to each other. To this end, the prior art has adopted and most commonly uses those universal joints that are characterized by inter-engaged yoke-like parts that are pivotally connected together on right angularly related axes by intermediate spider or pivot parts. Those universal joints are costly to make and maintain, are space-consuming and, from the standpoint of weight and size, they are relatively weak.

For many years, efforts were made to develop satisfactory semi-universal ball and socket-type couplings consisting of elongate female parts with polygonal socket openings entering their ends and elongate male parts with semi-spherical polygonal heads or balls engaged in the socket openings in the female parts to establish rotary driving engagement between the parts while allowing for axial misalignment and/or pivoting of the parts relative to each other. While such couplings have long been made and used, they were determined to be of extremely limited utility due to the great tendency for the balls to bind and lock up in the socket openings and to create excessive friction. Further, the application of moderate torsional forces resulted in rapid reduction of the balls.

The first practical and effective semi-universal ball and socket-type coupling provided by the prior art is that coupling which is the subject matter of the U.S. Pat. No. 5,069,569, issued Dec. 3, 1991, to Frank Lieser and entitled, "Universal Joint." That patented coupling distinguished from all previous ball and socket type couplings by forming the polygonal socket opening with convexly curved or crowned flats so that the flats on the polygonal ball (rather than the sharp corners defined by adjacent flats on the ball) engage related flats in the socket opening. Thus, the sharp corners of the ball do not engage the flats in the socket opening and the tendencies of the coupling to jam and for the ball to be reduced, etc., are eliminated.

The above-noted patent teaches a coupling structure in which the ball has a flat radially extending inner end that normally seats flat against the flat bottom surface of the socket opening.

The subject prior art patent also teaches the provision and use of an elongate helical spring part engaged about the exterior of and that extend between the male and female parts to normally yieldingly maintain the male and female parts in axial alignment and to yieldingly prevent axial separation or disengagement of the male and female parts.

Semi-universal ball and socket-type couplings made in accordance with the teachings of the above-noted patent have been produced and marketed. The commercial success of those couplings and tools in which those couplings are incorporated, has been notably adversely affected by the following facts:

(1) The springs engaged about the exteriors of and extending between the coupling parts are not, in fact, effective to prevent axial displacement and disengagement of the parts;

(2) The springs, when the couplings are operated, allow for the entry of foreign objects (including the user's clothing and flesh) between the convolutions thereof and pinch or clamp that which becomes engaged therein as the couplings rotate; and, (3) When the parts of the couplings are axially misaligned and the couplings are rotated, the contact between the bottom surface of the socket openings and the polygonal edges of the inner surface of the ball, that contacts the bottom surface of the socket opening, results in reciprocal movement of the ball in the socket opening which is transmitted throughout the couplings and is manifested in undesirable axial pulsing or hammering within and throughout the coupling and parts related to it.

In accordance with the foregoing, there has existed a recognized need to improve the above-noted patented semi-universal ball and socket coupling structure so that the male and female parts thereof cannot become disengaged; so that the external spring and the hazards caused thereby are eliminated; and, so that the coupling does not pulsate or hammer when rotated.

OBJECTS AND FEATURES OF THE INVENTION

It is an object of the present invention to provide an improved semi-universal ball and socket torque coupling with novel means to maintain the related female socket and male ball parts in desired and most effective axial working relationship relative to each other.

It is an object and feature of the invention to provide an improved coupling of the general character referred to above that includes an elongate helically wound coupling spring arranged centrally within the polygonal socket opening in a female part of the coupling and that is fixedly connected with and extends between the female part and the polygonal ball of the male part that is engaged in the socket opening to normally yieldingly maintain the male and female parts in axial alignment with each other; allow for yielding pivotal movement and axial misalignment of the parts; and, maintain the ball in axial spaced relationship from and out of interfering engagement with the bottom of the socket opening.

Another object and feature of the invention is to provide an improved coupling of the general character referred to above wherein the elongate coiled spring extends between an opening spring opening, in the socket of the female part and an inwardly opening spring opening in the polygonal ball of the male part to normally maintain the ball in desired longitudinal working position within the socket opening and to prevent movement of the inner surface of the ball into engagement with the bottom surface of the socket opening; and, that yieldingly prevents excess axial movement of the ball within the socket opening.

Yet another object and feature of the invention is to provide an improved coupling of the general character referred to above wherein the effective length, diameter and the number of convolutions of wire throughout the portion of the spring that extends between the bottom of the socket in the female part and the ball of the male part are such that upon relative pivotal movement and axial misalignment of the male and female parts and turning of the ball within the socket, the convolutions of wire throughout the central portion of the spring are yieldingly biased and offset radially to an extent that does not exceed the elastic limits of the spring and such that the radial displacement of the opposite ends of the central portion of the spring is not such that the axial stability of the spring to oppose and withstand compressive forces directed axially through the coupling is not adversely compromised.

Yet another object and feature of the invention is to provide a novel coupling of the general character referred above that includes novel means to maintain the polygonal ball of the male part in engagement within the polygonal socket opening of the female part and that includes a keeper part carried by the female part to occur adjacent and overlie a portion of the open forward end of the polygonal socket opening and that is engaged by and stops the polygonal ball when the ball is moved axially outward in the socket opening from its normal operating position therein.

It is yet another object and a feature of the present invention to provide an improved coupling of the general character referred to above wherein the keeper part is an annular ring that defines a polygonal opening substantially corresponding in cross-section with the socket opening and the ball and through which the ball can be moved when the ring is rotated so that the flat sides of the polygonal opening are in register with the flats on the ball. When the ring is rotated so that the flats in the opening are out of register with the flats on the ball, and the ring is secured to the female part, the ball cannot move through the ring and the ring prevents disengagement of the ball from within the socket opening.

Finally, it is an object and feature of the invention to provide a coupling of the general character referred to above wherein the keeper ring is secured to the female part by a retaining means including an annular flange on the keeper ring that is engaged about and is staked to the female part.

The above and other objects and features of the invention will be apparent and will be fully understood from the following detailed description of one typical preferred form and embodiment of the invention throughout which description reference is made to the accompanying drawings.

DESCRIPTION OF THE DRAWINGS

FIG. 1 is a longitudinal side elevational view of a torque tool embodying my new semi-universal ball and socket torque coupling;

FIG. 2 is a view similar to FIG. 1 with parts shown in section;

FIG. 3 is a view similar to FIG. 2 showing parts in another position;

FIG. 4 is an enlarged cross-sectional view showing the ball of the male part engaged in the socket opening of the female part and taken substantially as indicated by Line 4—4 on FIG. 2;

FIG. 5 is a plain view of the inside of the annular keeper ring;

FIG. 6 is a view showing the keeper ring engaged with the parts shown in FIG. 4 with the ring in pre-set rotative position;

FIG. 7 is a view similar to FIG. 6 with the ring in set rotative position;

FIG. 10 is a view showing the keeper ring engaged about the female part; and.

DETAILED DESCRIPTION OF THE INVENTION

Figure 8:
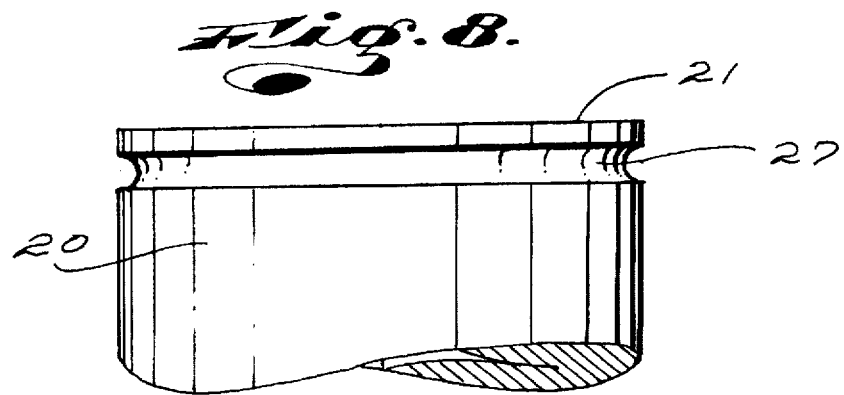
FIG. 8 is an elevational view of the forward portion of the female part.

The semi-universal ball and socket coupling U of the present invention can be put to many uses. For the purpose of this disclosure, I have elected to show the coupling U incorporated in a nut or bolt-turning tool T. The tool T includes an elongate torque shaft 10 with front and rear ends 11 and 12. The shaft can be of any desired length and can carry or be connected with any means (none shown) for turning the shaft about its central longitudinal axis. The front end of the shaft 10 is formed with an elongate female part 20 with front and rear ends 21 and 22. The female part 20 is formed with a central forwardly opening, elongate polygonal socket opening 23 that terminates in the part 20 at a flat, radially extending, axially forwardly disposed bottom surface 24.

The socket opening 23 is shown as a hexagonal opening having six circumferentially spaced, radially inwardly disposed, longitudinally extending flats 25 and intermediate inside corners 26, defined by adjacent flats.

In practice, the socket can be square, octagonal or any other suitable polygonal form one might wish to adopt and use.

The female part 20 is preferably cylindrical in cross-section and is shown as being formed with a radially outwardly opening recess or channel 27 in its forward end portion.

Next and finally, the female part 20 is formed with a spring-receiving opening 28 entering the bottom surface 24 of the socket opening, at the center thereof.

In the preferred carrying out of my invention, the coupling structure is made in accordance with the teachings of U.S. Pat. No. 5,069,569; that is, the elongate radially inwardly disposed flats 25, that extend longitudinally in the socket opening, are convexly curved or crowned laterally.

The coupling U next includes an elongate male part 30 having inner and outer end portions. The inner end portion of the male part is formed to establish a semi-spherical polygonal head or ball 31 with a central turning axis that is concentric with the longitudinal central axes of the male part. The polygonal ball 31 (through its central radial plane) is similar in cross-section with the socket opening 2 and such that when it is slidably engaged in the socket opening, it establishes minimum running clearance therewith.

More particularly, the ball 31 is hexagonal in cross-section and has a plurality (6) of circumferentially spaced radially outwardly disposed, substantially longitudinally extending flats 33; and, a plurality (6) of outside corners 34, defined by adjacent flats. The several flats and corners of the ball are made to oppose related flats and corners in the socket opening.

The ball 31 is engaged in the socket opening to establish rotary driving engagement with the female part and such that it is substantially free to be pivotally turned in the socket opening and relative to the female part.

In practice, the ball can be pivoted relative to the female part, so that the central longitudinal turning axis of the male part can be angularly related to the central longitudinal turning axis of the female part to an angle from, for example, 25°.

To reduce the weight and to minimize the length of the coupling, the inner end portion of the ball is truncated and defines a flat, radially extending inwardly disposed inner surface 35. The surface 35 is spaced axially forward of and normally opposes the bottom surface 24 of the socket opening.

The ball 31 is next formed with a central, elongate axially inwardly opening spring-receiving opening 36 that is normally axially aligned with the forward opening spring opening 28 in the female part.

The outer end portion of the male part 30 is formed to establish a work-engaging part or portion 37 that is integrally joined with the outer end portion of the ball. In the case illustrated, the portion or part 30 is a simple cylindrical nut or bolt head engaging drive socket.

In FIG. 2 of the drawings, I have shown the hexagonal head 38 of a screw fastener in close proximity to the tool T. The axis or the fastener is at an angle of 25° relative to the tool.

In FIG. 3 of the drawings, I have shown the male part 30 of the coupling angularly disposed relative to the female part and have shown the drive socket 37 of the coupling engaged with the head 38 of the fastener.

In practice, the work-engaging portion or part 37 of the coupling or tool can be of any desired form. For example, it might be a blade type screwdriver or Allen wrench without departing from the spirit of the invention.

The coupling structure U of the tool T next includes an elongate coupling spring 40. The spring 40 is helically wound of spring wire stock and with its adjacent convolutions in contacting or closed bearing engagement with each other. The spring has an inner end portion that is press-fitted into the opening 28 in the female part, an outer portion that is press-fitted into the opening 36 in the ball 31. Thus the ends of the spring are fixedly connected with the male and female parts. The spring has a central portion that extends axially freely between the bottom surface of the socket opening and the inner surface of the ball, as clearly shown in FIGS. 2 and 3 of the drawings.

The end portions of the spring 40 are fully press fitted into and stopped against the bottoms of their related openings 28 and 36.

The spring 40, which has closed convolutions and is not axially compressible, acts as a stop and limits axial inward movement of the ball in the socket opening and prevents the inner end surface of the ball from engaging and/or riding on the bottom surface of the socket opening. The spring is an axially non-compressible load supporting part. Thus, the coupling here provided is not subject to generating the pulsing and/or hammering motion that characterizes the above-noted ball and socket coupling of the prior art. While the spring is not axially compressible it is necessarily yieldingly axially extensible and yieldingly laterally bendable and deflectable.

In practice, the central portion of the spring extending between the bottom of the socket and inner end of the ball includes a sufficient number of convolutions of spring wire stock to allow for lateral biasing and bending of the spring when the axis of the male part is angularly related to the axis of the female part and the inner surface of the ball and the bottom surface of the socket opening, are misaligned, as clearly shown in FIG. 3 of the drawings.

Further, the diameter of the spring 40 is sufficiently large so that when it is fully laterally biased, during operation of the coupling, the lateral displacement of the opposite ends of the central portion of the spring is less than three-quarters the diameter of the spring and such that the axial stability of the spring and its ability to maintain the opposing surfaces 24 and 35 of the male and female parts spaced apart is not adversely affected.

It is important to note that the spring normally yieldingly maintains the male and female parts 20 and 30 in axial alignment, as shown in FIGS. 1 and 2 of the drawings; yet allows the parts 20 and 30 to be yieldingly urged into axial misalignment, as shown in FIG. 3 of the drawings.

It is also important to note that the ends of the spring 40 are press-fitted into their related openings 28 and 36 so that the spring yieldingly holds the ball in predetermined and desired longitudinal position within the socket opening.

The coupling structure U of the tool T next includes retaining means 50 carried by the female part 20 and engaging the male part 30 to limit axial outward movement of and to prevent displacement of the ball from within the socket opening.

Figure 9:
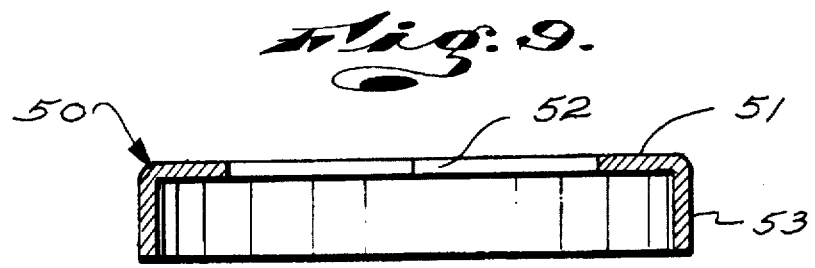
FIG. 9 is a cross-sectional view of the keeper ring.
Figure 10:
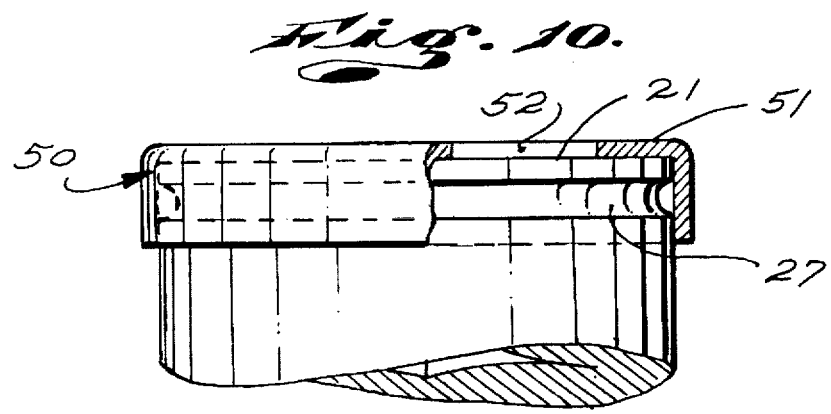
Figure 11:
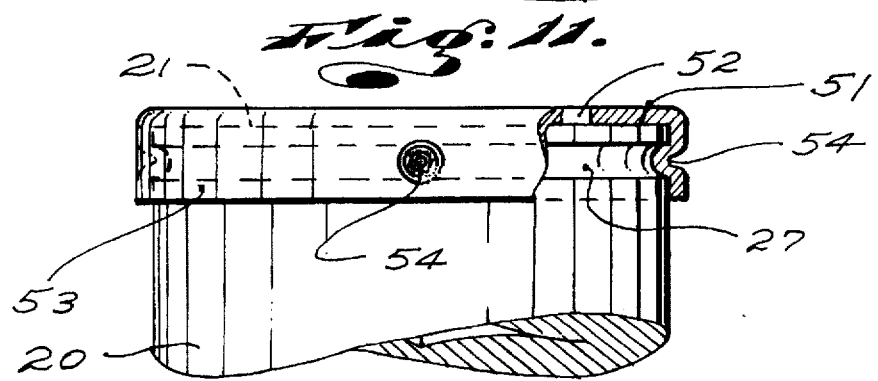
FIG. 11 shows the keeper retaining ring stacked on the female part.

In the form of the invention illustrated and as most clearly shown in FIGS. 4 through 11 of the drawings, the means 50 includes a keeper part 51 positioned adjacent to and carried by the forward end of the female part and that extends radially inwardly across interfering engagement into the open forward end of the socket opening and by or through which the ball cannot normally be moved.

In the preferred carrying out of my invention and as shown, the keeper part 51 is an annular keeper ring formed with a polygonal opening 52 through which the polygonal ball can be slidably moved when the ring is turned so that the flats of the polygonal ball and the straight or flat edges of the polygonal opening 52 are in register and through which the ball cannot be moved when the ring is rotated so that the flats on the ball and within the ring are out of register. In the case illustrated, rotation or turning of the ring 30° relative to the female part and the ball of the male part moves the polygonal opening 52 into and out of register with the polygonal ball. In FIG. 6 of the drawings, the ring is shown in a rotative position, relative to the ball, where the opening 52 in the ring is in register with the ball and such that the ball can be moved through the ring. In FIG. 7 of the drawings, the ring is shown rotated (30°), relative to the ball, and such that inner edge portions of the ring extend across and overlie the inside corner portions of the socket opening and such that the ball cannot be moved axially outwardly therethrough and be disengaged from within the female part.

With the above-noted keeper ring, the ring is first positioned about the inner portion of the ball and is rotated into alignment with the ball. The ring is then moved outwardly about the ball to occur about the outer end portion of the ball. Thereafter, the ball engaged in the socket opening and the ring is turned 30° out of register therewith and is fixed or secured to the outer end of the female part. With the parts thus arranged, the ball cannot be disengaged from within the socket opening.

It is to be noted that by providing the keeper ring with a polygonal opening, as illustrated and described above, it is possible to position the ring in proper working position relative to the ball regardless of the size and shape of the outer end or working-engaging portion of the male part of the coupling. Referring to the drawings, it will be noted that if the opening in the keeper ring was not polygonal and was such that the ball could not be moved through it, the coupling could not be assembled since the work-engaging part 37 is larger in diameter than the ball and such that the ring cannot be moved about it.

The ring 50 can be secured to the female part 20 in fixed position relative thereto by any suitable anchoring or fastening means.

While several different anchoring and fastening means can be employed to secure the ring 50 to the female part 20, it has been found that the anchoring means shown in the drawings is quite satisfactory and lends itself to the fast and economic manufacture of the new coupling.

The anchoring means, best shown in FIGS. 8 through 11 of the drawings, includes the aforementioned annular radially outwardly opening groove or channel 27 in the forward portion of the female part; an annular rearwardly projecting flange 53 about the outer perimeter of the ring 51 and slidably engaged about the outer end portion of the female member to overlie the channel. The flange, when set in desired position relative to the female part and the ball of the male part, it is staked to the female part by a plurality of circumferentially spaced radially inwardly formed dimples 54 formed in the flange and that are tightly entered into the channel.

In some tools in which my new coupling structure has been incorporated, the keeper ring has been soldered, welded and screw fastened to the female part. For example, in large couplings where the outside diameter of the female part is the order of 1-½" to 3", different and varied forms of means to secure it have been effectively employed. Those means include the use of screw fasteners and welding.

Having described only typical forms and embodiments of my invention, I do not wish to be limited to the specific details set forth above but wish to reserve to myself any modifications and/or variations that might appear to those skilled in the art and that fall within the scope of the following claims.

Having described my invention, I claim:

1. A semi-universal torque coupling comprising an elongate axially rotatable female part with front and rear ends and a forwardly opening elongate polygonal socket opening entering its front end, the socket opening has a plurality of circumferentially spaced radially inwardly disposed longitudinally extending flats and a forwardly disposed bottom at its rear end; an elongate axially rotatable male part with inner and outer end portions and normally axially aligned with and extending forwardly from the female part, the inner end portion of the male part is a semi-spherical polygonal ball corresponding in cross-section with and slidable engaged in the socket opening in the female part in rotary driving and axial pivotal engagement therewith; and, an elongate coupling spring positioned centrally within the socket opening and normally concentric with the male and female parts, the spring being helically wound with closed convolutions so as to be axially non-compressible, axially yielding extendable and laterally yielding deflectable, the spring has a rear end fixedly connected with the female part at the bottom of the socket opening and a front end fixedly connected with the ball, the spring yieldingly maintains the female and male parts in axial alignment and in predetermined axial position relative to each other.

2. The semi-universal torque coupling set forth in claim 1 that further includes an annular keeper ring carried by the female part at the front end thereof and that projects radially inwardly to overlay portions of the open front end of the socket opening and that is engageable by the ball to stop forward displacement of the ball from within the socket opening and to thereby limit axial extension of the spring.

3. The semi-universal torque coupling set forth in claim 1 that includes a central forwardly opening spring opening at the bottom surface of the socket opening and an inwardly opening spring opening in the inner end of the ball; the spring has rear and front end portions press fitted into the forwardly and inwardly opening spring openings respectively and an elongate central portion extending freely between the bottom of the socket opening and the ball.

4. The semi-universal torque coupling set forth in claim 1 in which the female part has a forwardly opening spring opening at the bottom surface of the socket opening and the male part has an inwardly opening spring opening in the ball; the spring has rear and front end portions press fitted into the forwardly and inwardly opening spring openings and has an elongate central portion extending freely between the bottom of the socket opening and the ball; said coupling further includes a keeper ring carried by the female part at the front end thereof and that projects radially inwardly about the open front end of the socket opening and that is engageable by the ball to limit axially forward extension of the spring and to stop forward displacement of the ball from within the socket opening.

5. The semi-universal torque coupling set forth in claim 1 that further includes an annular keeper ring rotatably carried by the female part at the front end thereof to selectively prevent axial forward movement of the ball from within the socket opening; the keeper ring has a polygonal opening corresponding in cross-sectional configuration with the cross-section of the socket opening and ball and through which the ball can move when the ring is rotated to a position where its polygonal opening is in register with the polygonal socket opening and through which the ball cannot move when the ring is rotated to a position where its polygonal opening is out of register with the polygonal socket opening.

6. The semi-universal torque coupling set forth in claim 1 that further includes an annular keeper ring rotatably carried by the female part at the front end thereof to selectively prevent axial forward movement of the ball from within the socket opening; the keeper ring has a polygonal opening corresponding in cross sectional configuration with the cross-section of the socket opening and through which the ball can move when the polygonal opening in the ring is in register with the polygonal socket opening and through which the ball cannot move when the polygonal opening in the ring is out of register with the polygonal socket opening; the keeper ring has an axially rewardly projecting annular flange surrounding the forward portion of the female part and includes means to releasably fix the ring to the female part in that rotative position where the polygonal opening and the socket opening are out of register.

7. The semi-universal torque coupling set forth in claim 1 that further includes an annular keeper ring rotatably carried by the female part at the front end thereof to selectively prevent axial forward movement of the ball from within the socket opening; the keeper ring has a polygonal opening corresponding in cross-sectional configuration with the cross-section of the socket opening and through which the ball can move when the polygonal opening in the ring is in register with the polygonal socket opening and through which the ball cannot move when the polygonal opening in the ring is out of register with the polygonal socket opening; the keeper ring has an axially rearwardly projecting annular flange surrounding the forward portion of the female part; the female part has a radially outwardly opening recess radially inward of the flange and into which a portion flange is formed to releasably fix the ring in desired rotative position on the female part.

* * * * *